J. F. CURTIS.
DYNAMO ELECTRIC MACHINE.
APPLICATION FILED APR. 25, 1914.
1,278,865.
Patented Sept. 17, 1918.
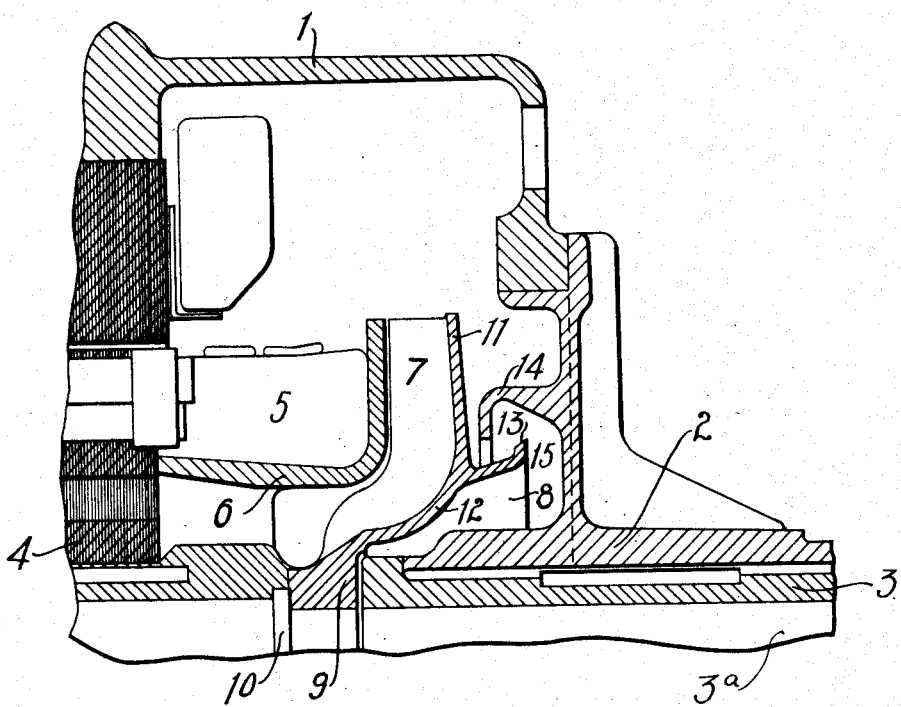
WITNESSES:
INVENTOR,
James F. Curtis
BY
ATTORNEY

UNITED STATES PATENT OFFICE.

JAMES F. CURTIS, OF PITCAIRN, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,278,865.

Specification of Letters Patent. Patented Sept. 17, 1918.

Application filed April 25, 1914. Serial No. 834,343.

*To all whom it may concern:*

Be it known that I, JAMES F. CURTIS, a citizen of the United States, and a resident of Pitcairn, R. F. D. No. 1, in the county of Westmoreland and State of Pennsylvania, have invented a new and useful Improvement in Dynamo-Electric Machines, of which the following is a specification.

My invention relates to dynamo-electric machines and it has special reference to certain structural features of the rotors of such machines.

The object of my invention is to simplify the structure and reduce the expense of manufacture of dynamo-electric machine rotors.

In the prior art, the rotors of certain types of dynamo-electric machines have been provided with sets of fan blades for the purpose of directing currents of cooling air through certain portions of the machine, the blades being either individually attached to the outer surface of the rotors or being secured to annular bands, which, in turn, were attached to the rotor bodies; also, separate wiper rings were disposed around the machine shaft for the purpose of expelling any excess oil or other lubricating material from the shaft bearing and away from the machine windings, during operation.

According to my invention, I provide an integrally combined wiper ring and set of fan blades for the rotors of dynamo-electric machines, thereby effecting economies in cost of manufacturing and in the space required in the machine. Other advantages will be hereinafter pointed out.

The single figure of the accompanying drawing is a sectional view of a portion of a dynamo-electric machine constructed in accordance with my invention.

Referring to the drawing, the structure here shown comprises a stator frame 1 of any usual construction having an end housing 2 within which is disposed a bearing 3 for rotatably supporting the machine shaft 3ª upon which is disposed the rotor 4. The rotor windings are provided with the usual overhanging end portions 5 and a shield member 6 which is bent at substantially right angles around the unprotected surfaces of the end portions 5. A set of fan blades 7 and a wiper ring 8 are integrally combined with an annular ring 9, which is disposed around the machine shaft 3ª intermediate the inner end of the bearing 3 and an annular shoulder 10, which is disposed on the shaft near the end of the rotor 4. The fan blades 7 may be spaced at any suitable intervals and are joined at their outer edges by a preferably integral stiffening member or web 11 which is curved downwardly and inwardly to meet the supporting annular ring 9. The wiper ring 8 is integral with the stiffening member 11, and employs the curved under surface 12 thereof for the purpose of conducting any excess of lubricating material from the shaft 3ª to the outer circular pointed rim 13 of the wiper ring. A hooked circular projection 14 is preferably integrally secured to the housing 2 in proximity to the wiper ring 8 for the purpose of forming therewith a chamber 15 for the purpose of gathering and conducting away, in a suitable manner, the material that is thrown off the rim 13.

Inasmuch as the individual functions of both the sets of fan blades 7 and the wiper ring 8 are familiar to those skilled in the art, no further description of their operation is deemed necessary.

I do not wish to be restricted to the specific structural details herein set forth, but desire that only such limitations shall be imposed as are indicated in the appended claims.

I claim as my invention:

1. In a dynamo-electric machine, the combination with a rotor provided with a rotatable shaft and a lubricated bearing for said shaft, of a plurality of fan blades secured to one end of said rotor for directing a cooling current of air through certain portions thereof, and an annular member secured to said fan blades in spaced relation and surrounding the adjacent portion of said bearing for centrifugally expelling excess lubricating material away from the shaft.

2. In a dynamo-electric machine, the combination with a rotor provided with a rotatable shaft and a lubricated bearing for said shaft, of a plurality of fan blades secured to one end of said rotor for directing a cooling current of air through certain portions thereof, and an oil-throwing ring integral with said fan blades and surrounding the adjacent portion of said bearing.

3. In a dynamo-electric machine, the combination with a rotor provided with a rotatable shaft and a lubricated bearing for said shaft, of an integrally combined oil-throwing ring and set of fan blades disposed around the shaft and surrounding the adjacent portion of said bearing.

4. The combination with a rotatable member, a lubricated bearing for said member and a bearing housing provided with an annular flange spaced from and surrounding said bearing of a fan carried by said shaft and provided with an annular member located within said flange for centrifugally expelling excess lubricating material away from said shaft.

In testimony whereof I have hereunto subscribed my name this 18th day of April, 1914.

JAMES F. CURTIS.

Witnesses:
 EDWIN TIDLUND,
 B. B. HINES.